United States Patent [19]
Plavcan et al.

[11] Patent Number: 5,921,485
[45] Date of Patent: Jul. 13, 1999

[54] FOOD PROCESSOR

[75] Inventors: Daniel J. Plavcan, Stratford, Conn.;
Paul Holbrook, Buffalo Grove, Ill.

[73] Assignee: HP Intellectual Corp., Wilmington, Del.

[21] Appl. No.: 09/058,148

[22] Filed: Apr. 10, 1998

[51] Int. Cl.$^6$ .................................................. B02C 18/18
[52] U.S. Cl. ...................................................... 241/282.2
[58] Field of Search .................... 241/92, 282.1, 241/282.2, 37.5

[56] References Cited

U.S. PATENT DOCUMENTS

| | | | |
|---|---|---|---|
| D. 324,322 | 3/1992 | Barrault | D7/384 |
| 1,971,257 | 8/1934 | Fitzgerald | 259/131 |
| 4,127,342 | 11/1978 | Coggiola | 403/243 |
| 4,143,824 | 3/1979 | Shiotani | 241/282.1 |
| 4,173,310 | 11/1979 | Schaeffer | 241/282.1 |
| 4,194,697 | 3/1980 | Lembeck et al. | 241/92 |
| 4,216,917 | 8/1980 | Clare et al. | 241/37.5 |
| 4,240,338 | 12/1980 | McClean | 99/501 |
| 4,297,038 | 10/1981 | Falkenbach | 366/206 |
| 4,305,180 | 12/1981 | Schwartz | 24/221 R |
| 4,325,643 | 4/1982 | Scott et al. | 366/200 |
| 4,331,300 | 5/1982 | Hicks et al. | 241/282.1 |
| 4,387,860 | 6/1983 | Necas et al. | 241/282.1 |
| 4,396,159 | 8/1983 | Podell | 241/37.5 |
| 4,507,006 | 3/1985 | Golob et al. | 403/24 |
| 4,523,720 | 6/1985 | Behringer et al. | 241/37.5 |
| 4,540,128 | 9/1985 | Breeden | 241/37.5 |
| 4,669,672 | 6/1987 | Fuhner et al. | 241/57 |
| 4,700,903 | 10/1987 | Henn | 241/101.2 |
| 4,706,896 | 11/1987 | Moon-Kau | 241/37.5 |
| 4,752,041 | 6/1988 | Franke | 241/282.1 |
| 4,799,626 | 1/1989 | Hickel et al. | 241/37.5 |
| 4,824,029 | 4/1989 | Stottmann et al. | 241/375 |
| 5,421,248 | 6/1995 | Hsu | 99/512 |
| 5,454,299 | 10/1995 | Gonneaud | 99/492 |
| 5,486,050 | 1/1996 | Lenting | 366/314 |

FOREIGN PATENT DOCUMENTS

| | | |
|---|---|---|
| 1078291 | 5/1980 | Canada . |
| 2498738 | 7/1982 | France . |

*Primary Examiner*—Mark Rosenbaum
*Assistant Examiner*—William Hong
*Attorney, Agent, or Firm*—Barry E. Deutsch

[57] ABSTRACT

A first embodiment of a food processor 30 includes a base housing 32, a bowl 34, an implement 132 and a lid 36 formed with a two chute unit 201 and a food pusher 208 for facilitating the introduction of foodstuff into the bowl. A second embodiment of a food processor 230 further includes a small bowl 234 and a lid 236 therefor. A motor 38 is contained within the base housing 32 and selectively drives a shaft 40 which is coupled to the implement 132 for rotation thereof.

17 Claims, 17 Drawing Sheets

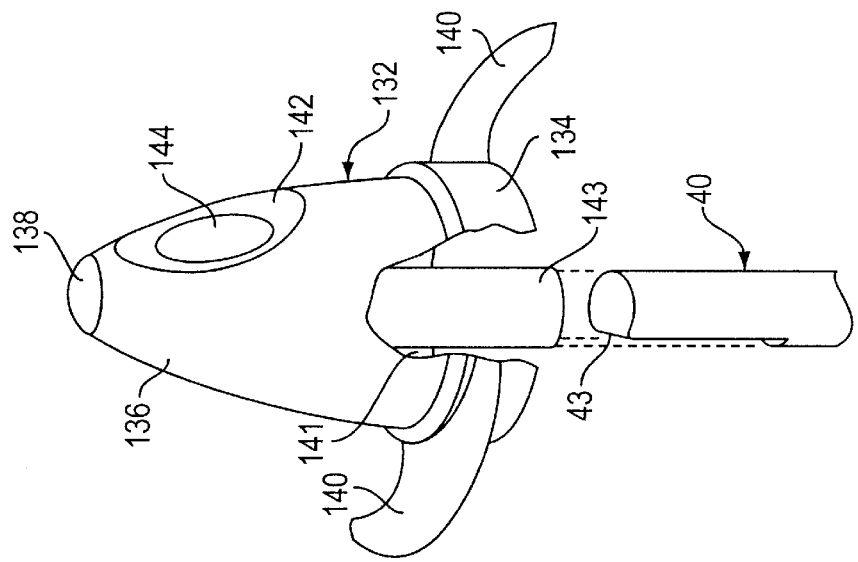
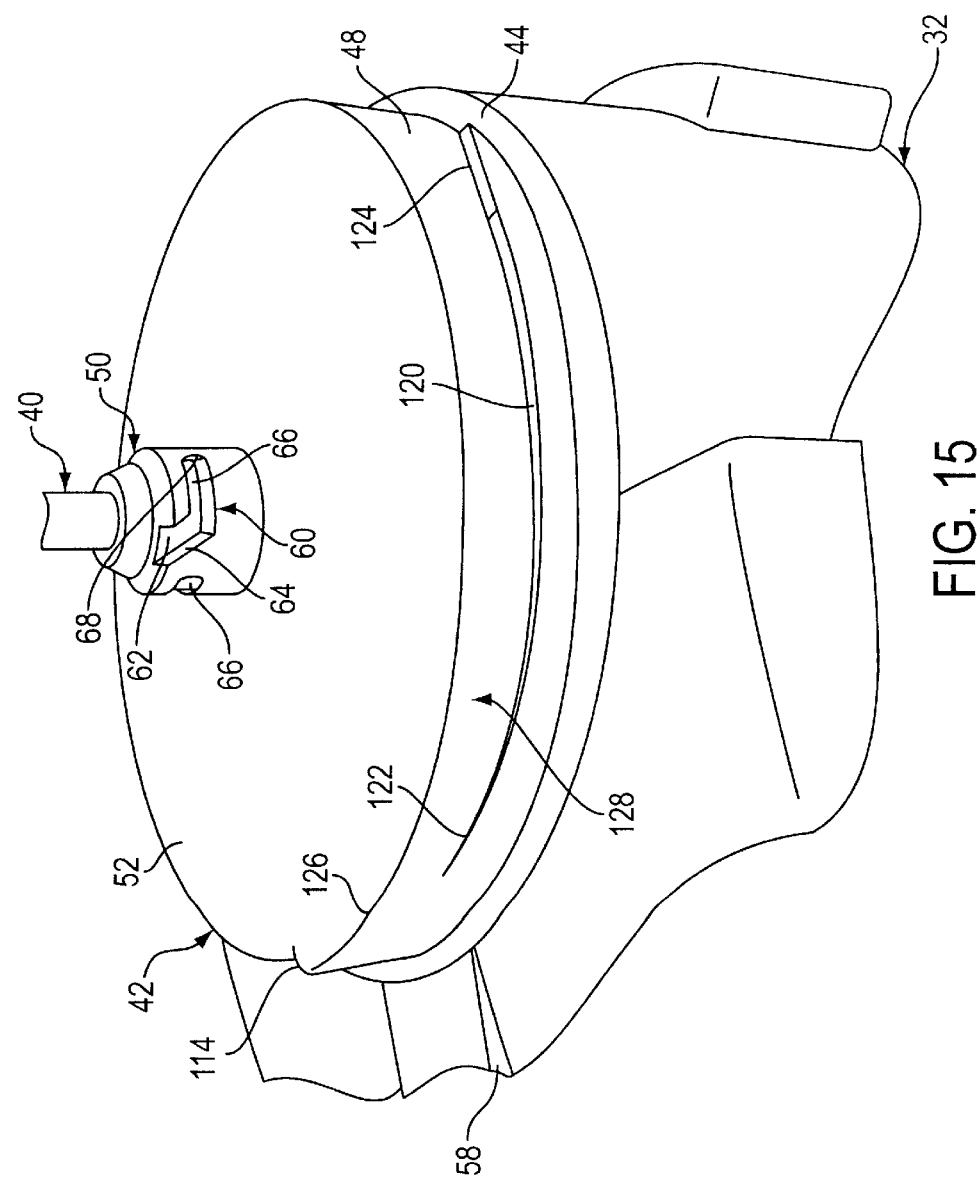

FOOD PROCESSOR

BACKGROUND OF THE INVENTION

This invention relates to a food processor, and particularly relates to a food processor which includes a food processing container having a working implement within the container, and a motor for driving the implement to process foodstuff deposited into the container.

A typical food processor includes a base housing which contains a motor for driving a shaft extending upward and outward from the housing. A food processing container, such as, for example, a bowl, is formed with an opening in the bottom thereof and is designed to set on top of the base housing. The shaft extends into the bowl through the bottom opening thereof and supports a food processing implement, such as, for example, a blade cutter or a disk. A lid is placed over the top of the bowl and the motor is selectively operated to rotate the shaft and the implement within the bowl whereby foodstuff in the bowl is, for example, shred, sliced, grated, and/or mixed.

The bowl, the base housing and the lid may include structure which cooperates in a complementary sense to insure that the bowl is firmly attached to the base housing, and the lid to the bowl, before the motor can be operated to rotate the implement. Typically, the bowl is set on the base housing and the bowl is rotated to facilitate the latching of the bowl to the base housing. At times, a user of the food processor may rotate the bowl in the incorrect direction whereby the bowl could become jammed on the base housing, and not be assembled in condition for the food processing operation.

Thus, there is a need for cooperative structure on the base housing and the bowl which insures that the bowl can not be jammed onto the base housing by rotating the bowl in the incorrect direction.

Also, in many food processors, a hub is formed on the top of the base housing and surrounds a portion of the shaft which is rotatable relative thereto. The hub is formed with a slot which is situated to receive a lug formed internally on a sleeve which extends upward within, and from the base of, the bowl surrounding the opening in the bottom thereof. This structure provides a facility for firmly attaching the bowl to the base housing during a food processing operation.

In some instances, the slot is "L" shaped whereby the bowl suddenly drops when the lug is aligned with a vertical leg of the "L" shaped slot. The bowl is then rotated to move the lug into a horizontal leg of the slot. The abrupt drop of the bowl when the lug aligns with the vertical leg of the slot could be disturbing to the user, and could cause premature wear or breakage of the lug and the base of the vertical leg of the slot, Thus, there is a need for a more user-friendly and less abusive facility for attaching the bowl to the base housing.

Typically, a food processor includes several implements which are removably attachable to the shaft of the processor for processing the foodstuff in the bowl. Some of the implements include a post for assembly with the shaft. During handling of the implement, and the assembly thereof with the shaft, the person, or user, performing the assembly process should ba able to manipulate the implement. In many instances, the structure and design of the post is such that the user cannot obtain an adequate or firm grip of the implement during handling and assembly of the implement.

Therefore, there is a need for an implement which includes structure which enhances the gripping of the implement for handling during cleaning, storing and assembly of the implement.

SUMMARY OF THE INVENTION

Therefore, it is an object of this invention to provide a food processor formed with cooperative structure on a base housing and a bowl to insure that the bowl can not be jammed onto the base housing by rotating the bowl in the incorrect direction.

Another object of this invention is to provide a more user-friendly and less abusive facility for attaching the bowl to the base housing.

A further object of this invention is to provide a food processor having an implement which is structured to allow a user to firmly grip the implement during handling thereof for cleaning, storing and assembly thereof with a shaft of the processor.

With these and other objects in mind, this invention contemplates a food processor having a base housing, a motor, a shaft driven by the motor for rotation relative to the base housing and having an extended portion extending outward from the base housing. The food processor further includes a bowl having an opening formed in a bottom thereof. The opening of the bowl locates about the extended portion of the shaft when the bowl is placed on the base housing and moved in a first direction into a food processing position relative to the base housing. The base housing is formed with structure which cooperates with structure formed on the bowl for precluding movement of the bowl relative to the base housing in a second direction in an attempt to assemble the bowl with the base housing for a food processing operation.

This invention further contemplates a food processor having a base housing, a motor, and a hub with a central opening therethrough. A shaft extends through the central opening of the hub and is driven by the motor for rotation relative to the base housing and the hub. The food processor further includes a bowl having an opening formed in a bottom thereof and at least one projection extending laterally therefrom. The opening of the bowl locates about the extended portion of the shaft when the bowl is placed on the base housing and is moved into a food processing position relative to the base housing. The hub is formed with structure for receiving the projection of the bowl as the bowl is being assembled with the base housing and facilitates the gradual movement of the bowl into assembly with the base housing and about the hub.

This invention also contemplates a food processor having a base housing, a motor contained within the housing, and a hub formed on the housing with a central opening therethrough. A shaft extends through the central opening of the hub and is driven by the motor for rotation relative to the base housing and the hub. The processor also includes a shaft-mountable implement with structure to allow a user to obtain a firm grip of the implement during handling thereof.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 10 is a perspective view of a cutting implement formed with a cutting facility to enhance safe and easy handling of the implement in accordance with certain principles of the invention;

FIG. 15 is a partial perspective view showing structure formed on the base housing which assists in the prevention of an attempt to assemble the bowl with the base housing from an incorrect position in accordance with certain principles of the invention;

DETAILED DESCRIPTION OF THE PREFERRED EMBODIMENTS OF THE INVENTION

Figure 1:
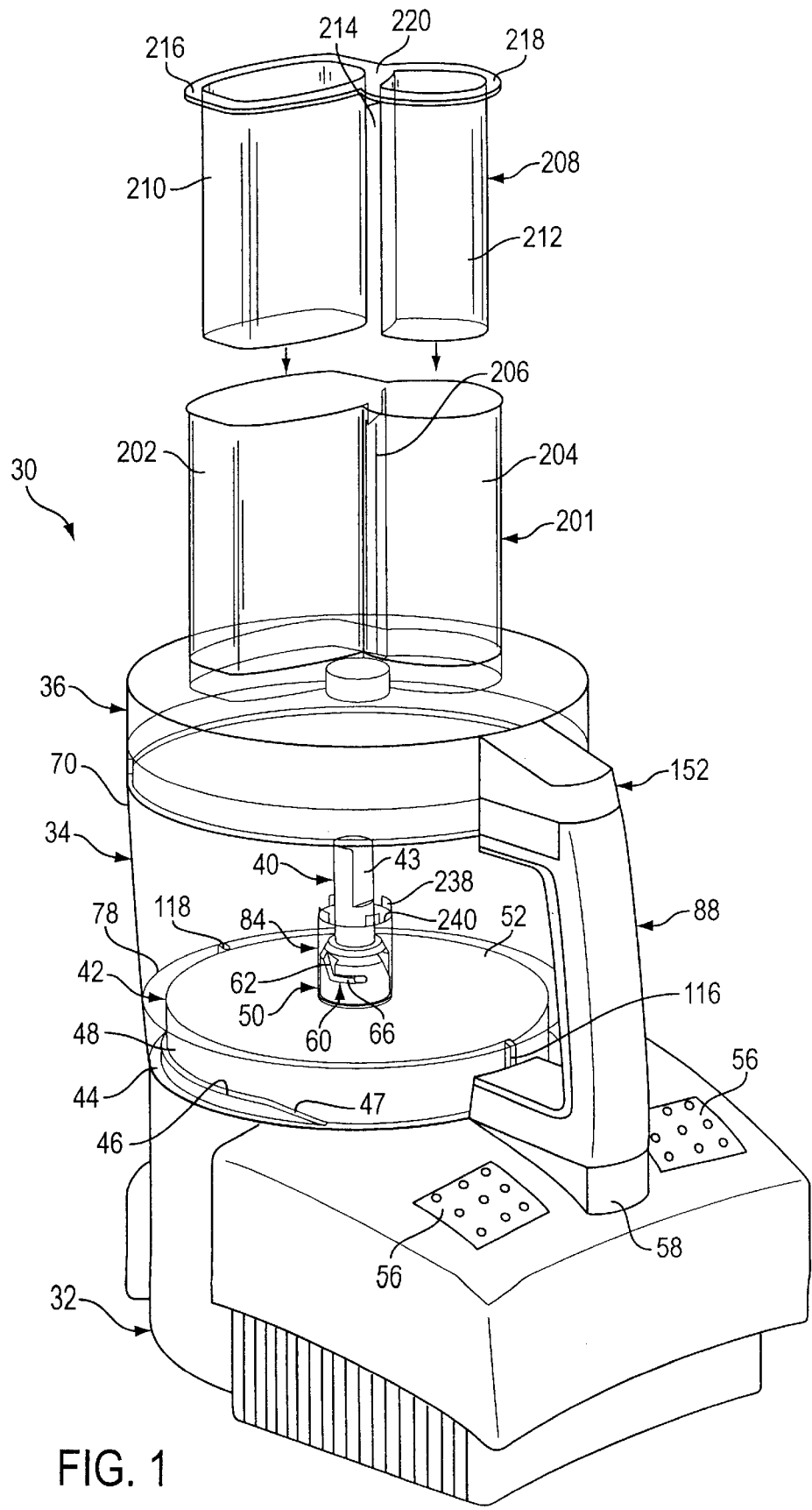
FIG. 1 is a perspective view showing a food processor with a base housing and a bowl with a handle in accordance with certain principles of the invention.

Referring to FIG. 1, a food processor 30 includes a base housing 32, a bowl 34 and a lid 36. A motor 38 (FIG. 16) is contained within the base housing 32 for driving a shaft 40 which extends upward and outward from a generally circular platform 42 formed at the top of the base housing. The shaft 40 is generally formed with a round cross section, but is formed with a flat surface 43 at the upper end thereof. The platform 42 rises from a ledge 44 of the base housing 32 and is formed with a first stepped ledge 46 on a side wall 48 thereof. A down ramp 47 extends from one end of the ledge 46 to the ledge 44. A hub 50 is formed centrally and axially on a top surface 52 of the platform 42 and includes an opening 54 (FIG. 16) through which an intermediate portion of the shaft 40 is located, and from which the shaft extends upward and outward.

The base housing 32 is also formed with a pair of compliant pads 56 which provide user access for controlling the operation of the motor 38, and thereby the food processor 30. A handle base 58 is also formed on the base housing 32. A plurality of compliant feet 59 are attached to the bottom of the base housing 32.

Figure 2:
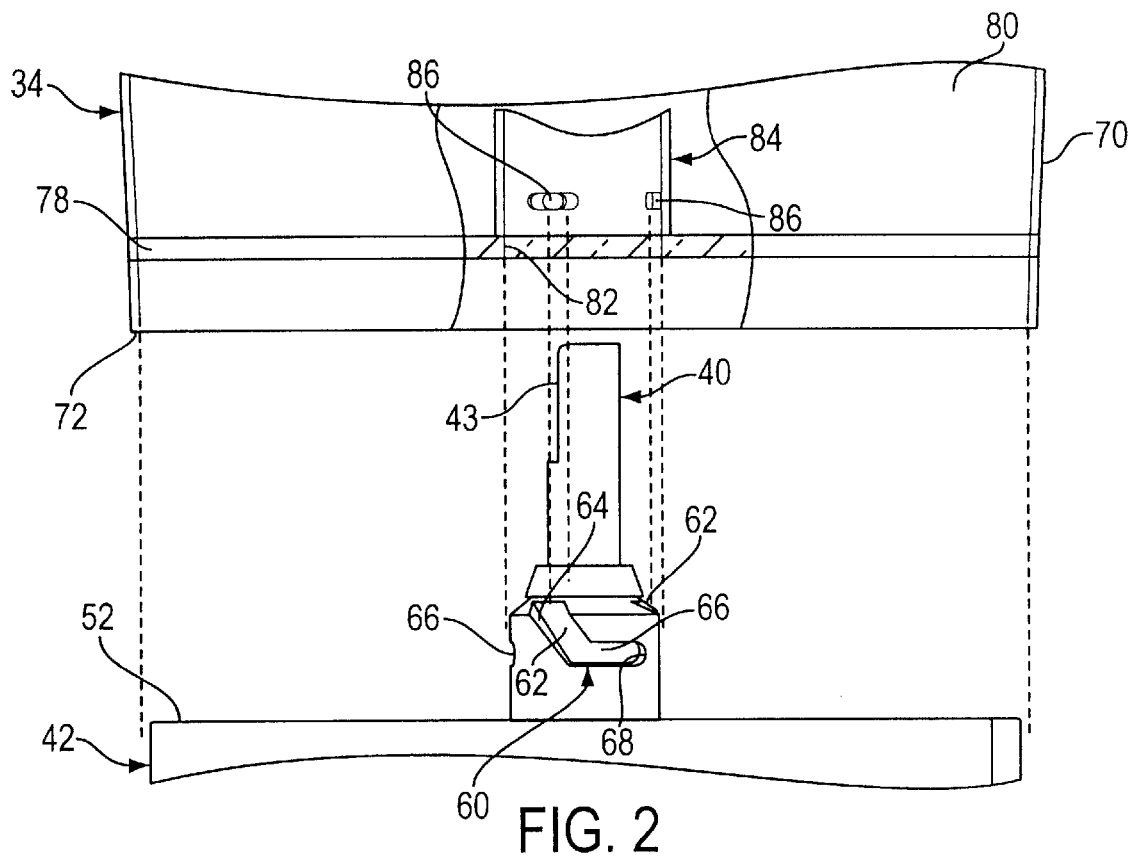
FIG. 2 is a side view showing a fixed hub with a slot, and shaft in alignment with a lug of the bowl of the food processor of FIG. 1 in accordance with certain principles of the invention.

Referring to FIGS. 1 and 2, the hub 50 is formed with a plurality of angled slots 60, one of the slots being fully visible and the remaining slot(s) being located on the opposite side of the hub and nearly out of view. Each of the slots 60 is formed with a first leg 62 which is angled downward, from the top of the hub 50, and toward the right, as viewed in FIGS. 1 and 2, to provide a sloping outboard bearing wall 64. An upper end of the first leg 62 of each of the slots 60 is open and a lower end thereof joins and communicates with a second leg 66 of each of the slots. The second leg 66 of each of the slots extends horizontally, or transaxially, from its juncture with the first leg 62, partially around the hub 50 and terminates at an end or stop wall 68 of the second leg.

Figures 4, 5:
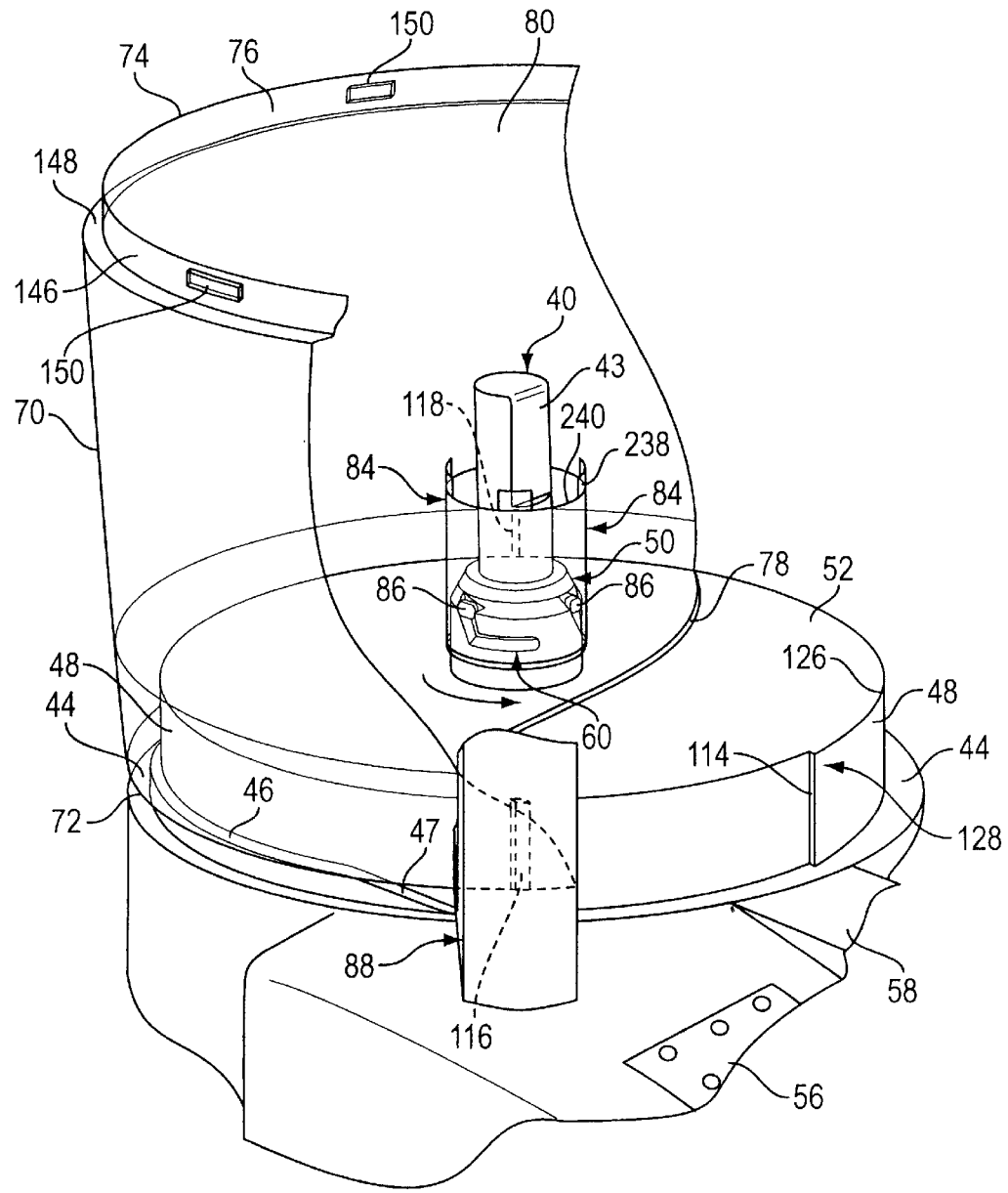
FIG. 4 is an enlarged perspective view of the attaching facility of FIG. 3.
FIG. 5 is a perspective view of the base housing and the bowl, with portions removed, of FIG. 1, showing the relationship of the lug and the slot as the bowl is assembled with the base housing in accordance with certain principles of the invention.
Figure 6:
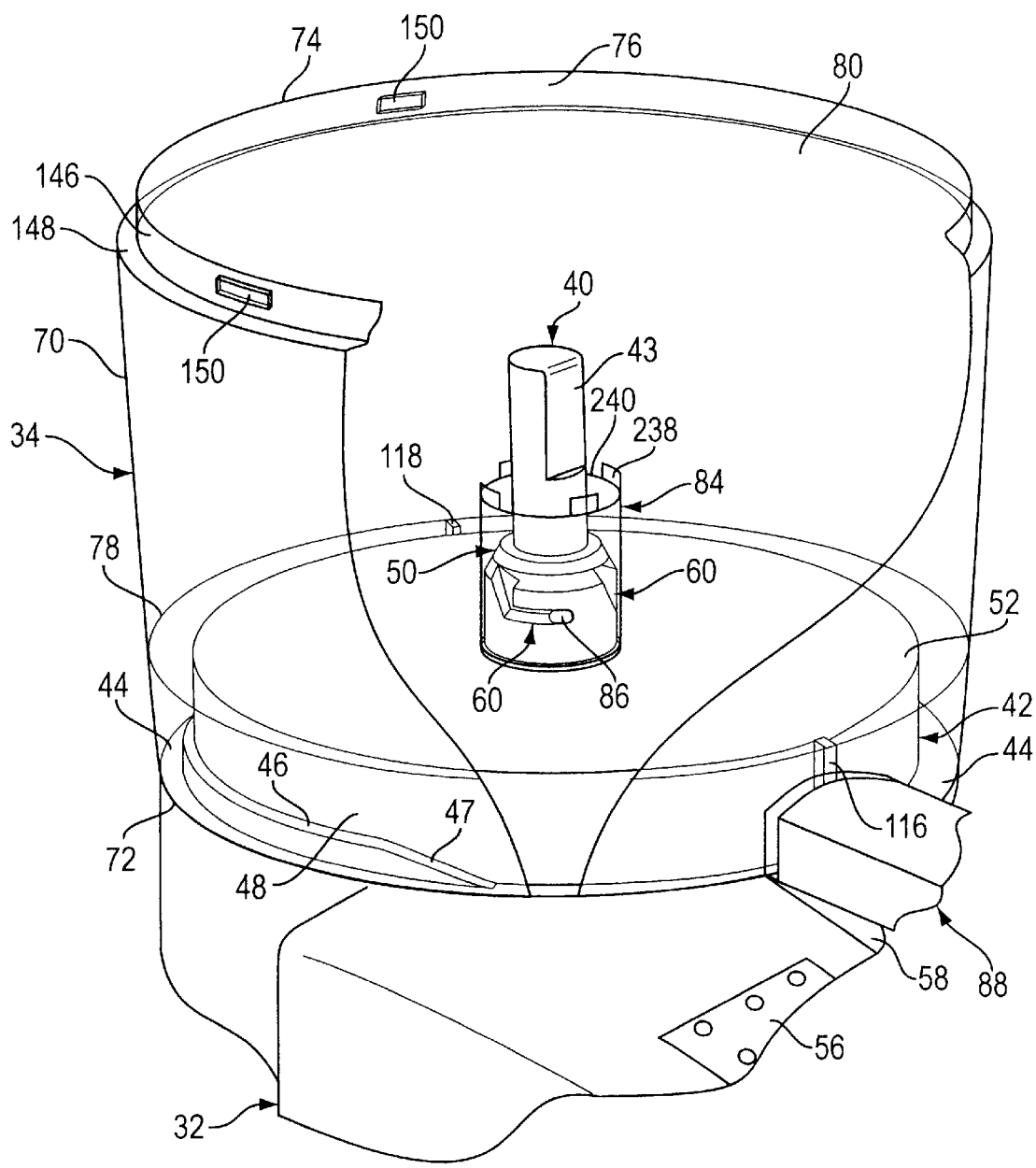
FIG. 6 is a perspective view similar to the view of FIG. 5 showing the relationship of the lug and slot following attachment of the bowl with the base housing in accordance with certain principles of the invention.
Figure 7:
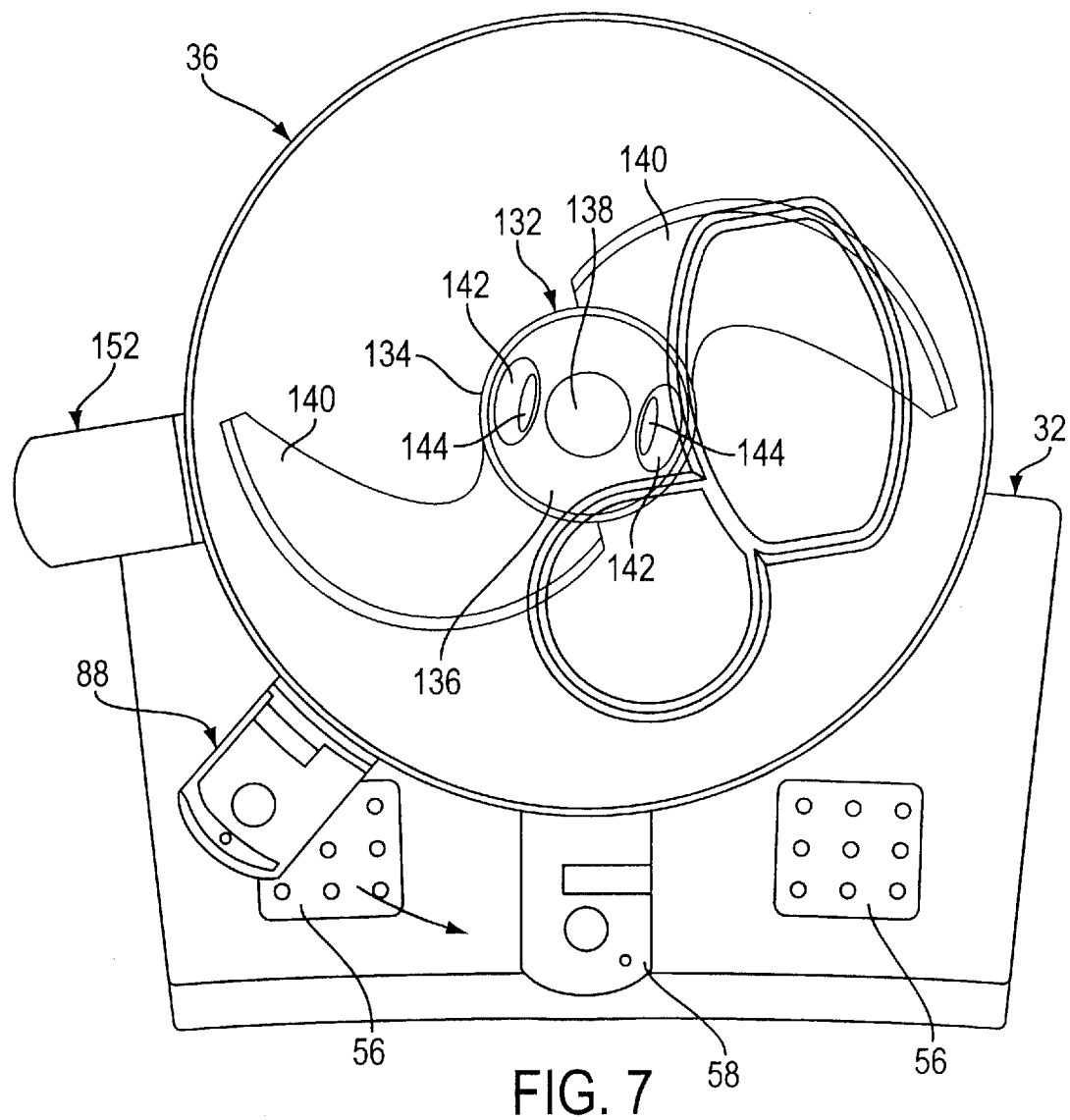
FIG. 7 is a top view showing the handle of the bowl being moved into assembly with a handle base of the base housing.
Figure 8:
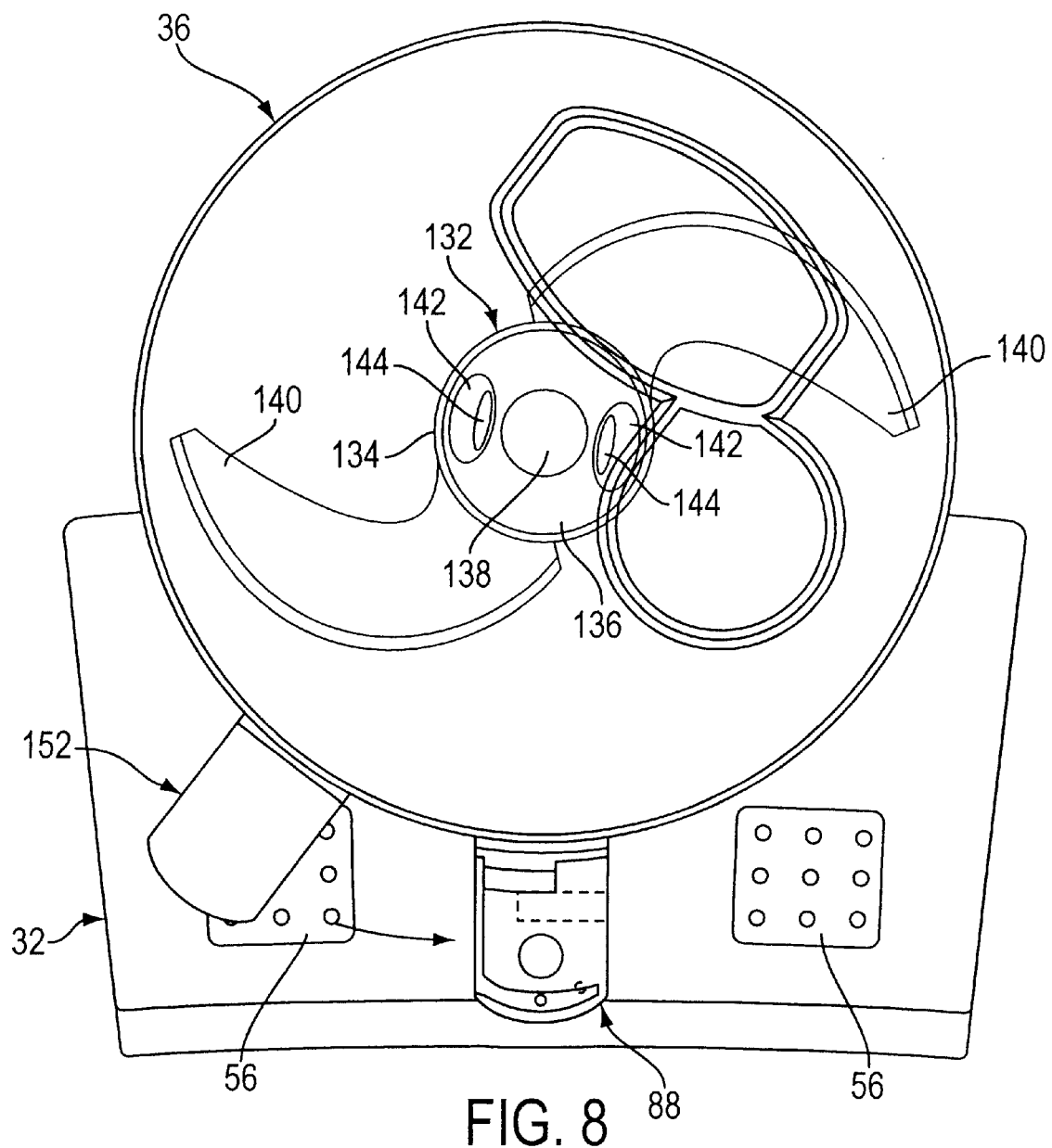
FIG. 8 is a top view showing the handle of the bowl in the position of assembly with the handle base, and with a handle portion of a lid in near assembly with the handle.
Figure 9:
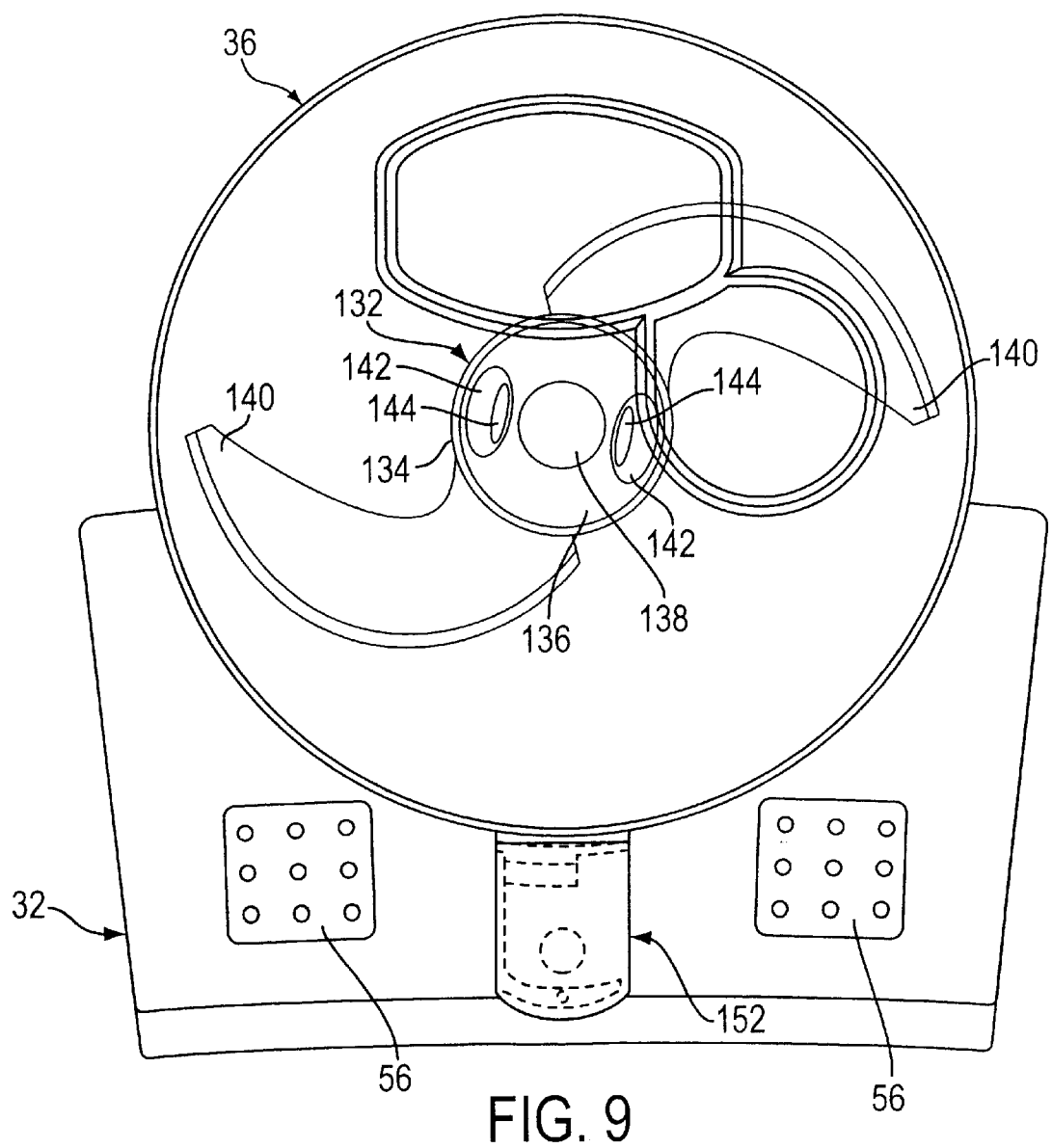
FIG. 9 is a top view showing the handle portion of the lid in position of assembly with the assembled handle.

The bowl 34 is generally cylindrical in shape, with a side wall 70 which tapers slightly outward from a bottom edge 72 nearly to a top edge 74 thereof, with the top edge defining an upper opening 76 of the bowl. The bowl 34 is formed with a base or floor wall 78 which is horizontal, or transaxial, and which is recessed inward from the bottom edge 72 of the bowl. As shown in FIGS. 5 and 6, the side wall 70, the upper opening 76 and the floor wall 78 define a well 80 of the bowl 34 which is the depository for the foodstuff to be processed.

As shown in FIGS. 1, 2, 5 and 6, the floor wall 78 of the bowl 34 is formed centrally axially with an opening 82 and a cylindrical sleeve 84 which surrounds the opening 82 and extends upward from the floor wall into the well 80. This structure facilitates eventual positioning of the upper portion of the shaft 40 through the opening 82 and the sleeve 84 into an intermediate portion of the well 80 of the bowl 34. Referring to FIG. 2, a plurality of lugs 86, corresponding in number to the number of slots 60, are formed on, and extend radially inward from, a lower portion of an inner wall of the sleeve 84. When the bowl 34 is to be assembled with the base housing 32, the bowl is positioned above the base housing, as shown in FIG. 2, with the lugs 86 of the sleeve 84 being aligned with the upper end openings of the angled leg 62 of the slots 60. As shown in FIG. 5, the bowl 34 is lowered toward the base housing 32 whereby the lugs 86 move into the upper end openings of the slots 60. Under the weight of the bowl 34, the lugs 86 engage and travel along the sloping walls 64 of the slots 60 to provide rotary and downward movement of the bowl about the hub. This facilitates a gradual, and user friendly, downward travel of the lugs 86 which slide over the sloping walls 64 to the juncture of the first leg 62 and the second leg 66 of the slots 60. If desired, a slight rotary motion may be applied to the bowl, as shown in FIG. 5, to assist the gradual downward travel of the bowl 34. Thus, with the structurally-assisted soft and gradual downward travel of the lugs 86 through the first leg 62 of the slots 60, any abrupt drop of the bowl 34 during assembly thereof with the base housing 32 is avoided.

When the lugs 86 reach the juncture of the first leg 62 and the second leg 66 of the slots 60, the bowl 34 is turned in the direction of the arrow in FIG. 5 until the lugs engage the end wall 68 of the slots as shown in FIG. 6. In this position, the bowl 34 is coupled to the base housing 32 in such a manner that, as the foodstuff is being worked within the well 80, the relative movement of the foodstuff in the bowl is in a direction which continuously urges the lugs 86 against the end walls 68.

Figure 3:
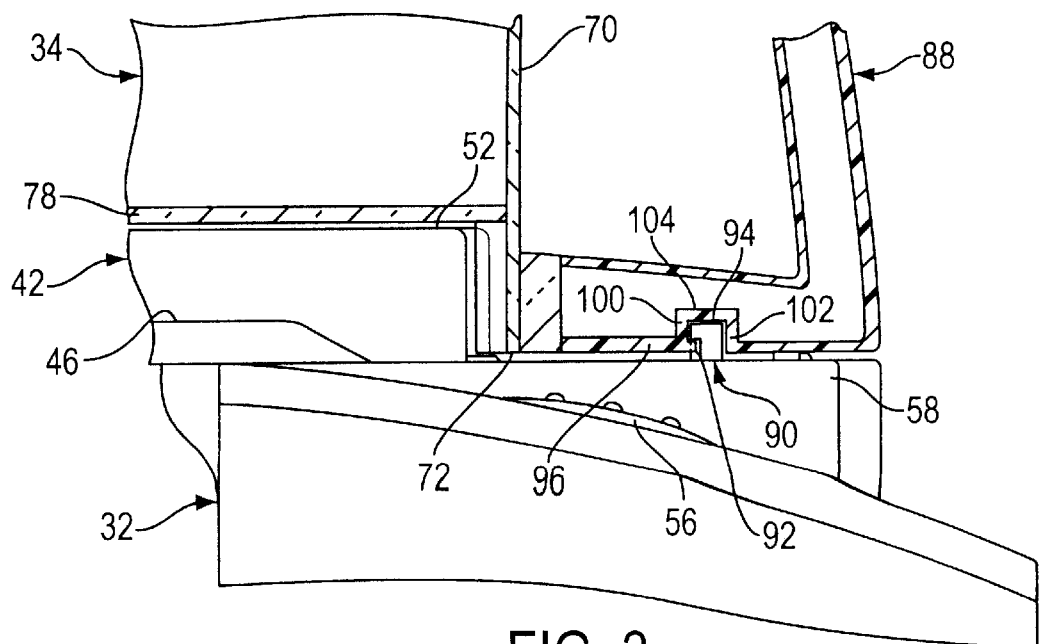
FIG. 3 is a partial side and sectional view of a portion of the handle and bowl of FIG. 1 showing a facility for attaching the handle to the base housing.

As shown in FIGS. 1, 3, 5 and 6, the bowl 34 is formed with a "D" shaped handle 88, which extends outward at opposite ends thereof from the side wall 70 of the bowl at the top and bottom thereof. Referring to FIGS. 3 and 4, an inverted "L" shaped block 90 is formed on the top of the handle base 58, and includes an overhanging ledge 91 having an undersurface 92 and an upper surface 94. A lower horizontal leg 96 of the handle 88 is formed with a slot 98 having two spaced vertical walls 100 and 102 and a linking overhead wall 104 with an undersurface 106 extending between and linked to upper ends of the vertical walls. The slot 98 includes a short ledge 108 and a recessed wall 110. When the bowl 34 is rotated into assembly with the base housing 32, the undersurface 106 of the wall 104 moves over the upper surface 94 of the block 90. Also, the ledge 108 moves into a space located beneath the undersurface 92 of the block 90, and an outboard wall 112 of the ledge is located adjacent the recessed wall 110. In this manner, the handle 88 is attached to the base housing 32.

As shown in FIG. 5, the peripheral edge of the top surface 52 is not perfectly circular, but is formed with a very slight radial offset which results in the formation of a vertical stop shoulder 114. As shown in FIGS. 1, 5 and 6, diametrically opposed, spaced portions of the bowl 34 between the bottom edge 72 and the underside of the floor wall 78 are formed internally with two vertically aligned ribs 116 and 118. Referring to FIG. 15, the side wall 48 of the platform 42 is formed with a second stepped ledge 120 on a side of the platform opposite the side on which the first stepped ledge 46 is formed. The stepped ledge 120 is tapered in a horizontal plane at one end 122 thereof, whereby the edges of the stepped ledge converge. A down ramp 124 is formed at the opposite end of the stepped ledge 120.

Figure 11:
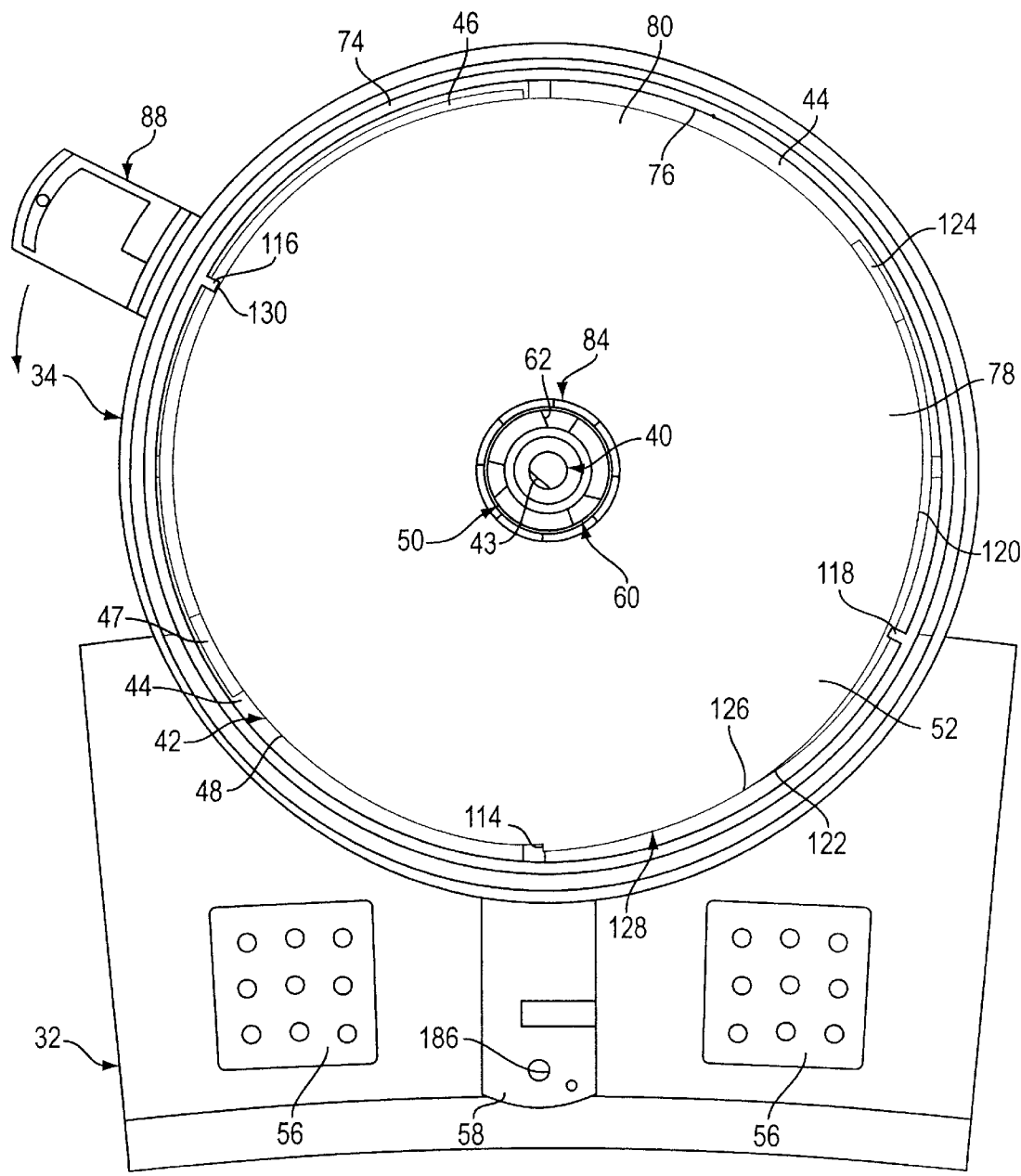
FIG. 11 ia a top view of the base housing and bowl of FIG. 1 showing the correct direction of assembling the bowl with the base housing in accordance with certain principles of the invention.

As shown in FIG. 11, a portion 126 of the peripheral edge of the top surface 52 of the platform 42 extends in a clockwise direction between the location at which the sides of the ledge 120 begin to converge and the location of the stop shoulder 114. This creates a wedging arc section 128 in the side wall 48 contiguous with the portion 126, which arc section detours radially outward from the generally circular, remaining portion of the peripheral edge of the surface 52. With this structure, the side wall 48 is slightly out-of-round.

Figure 12:
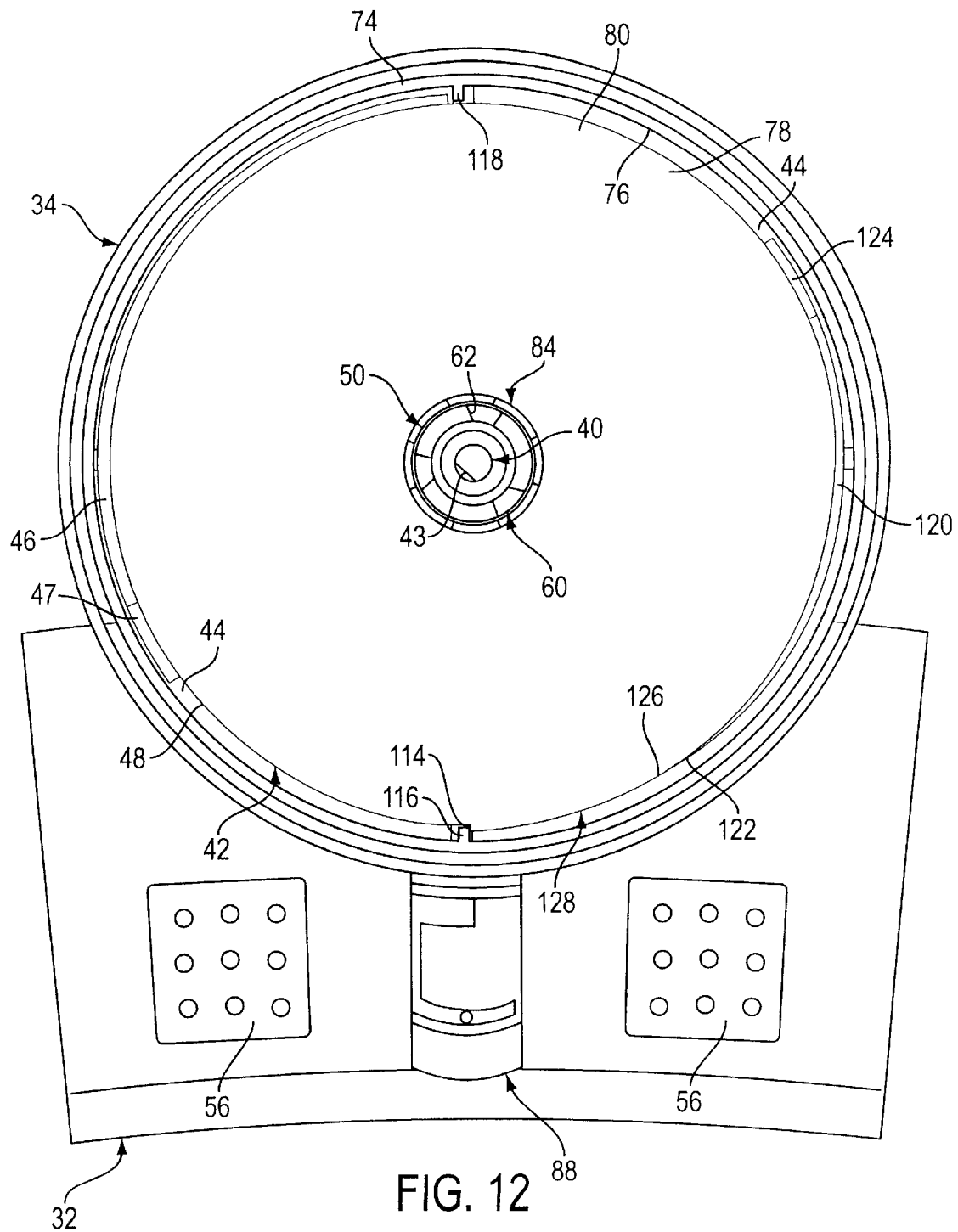
FIG. 12 is a top view showing the bowl in correct assembly with the base housing.

Referring to FIG. 11, when the bowl 34 is to be assembled with the base housing 32, the bowl is situated over the housing so that the handle 88 is in a ten o'clock position as shown in the FIG. 11. In this position, the bottoms of the ribs 116 and 118 will rest on the first and second stepped ledges 46 and 120, respectively. The handle 88 is then moved in a counterclockwise direction as shown by the arrow, whereby the ribs 116 and 118 move onto and over the down ramps 47 and 124, respectively, to locate the ribs on the ledge 44 and thereby lower the bowl 34 to its assembled level. The handle 88 continues to be moved in the counterclockwise direction until the rib 116 engages the stop shoulder 114, whereby the bowl is in its final assembled position at a six o'clock position as shown in FIG. 12.

Figure 13:
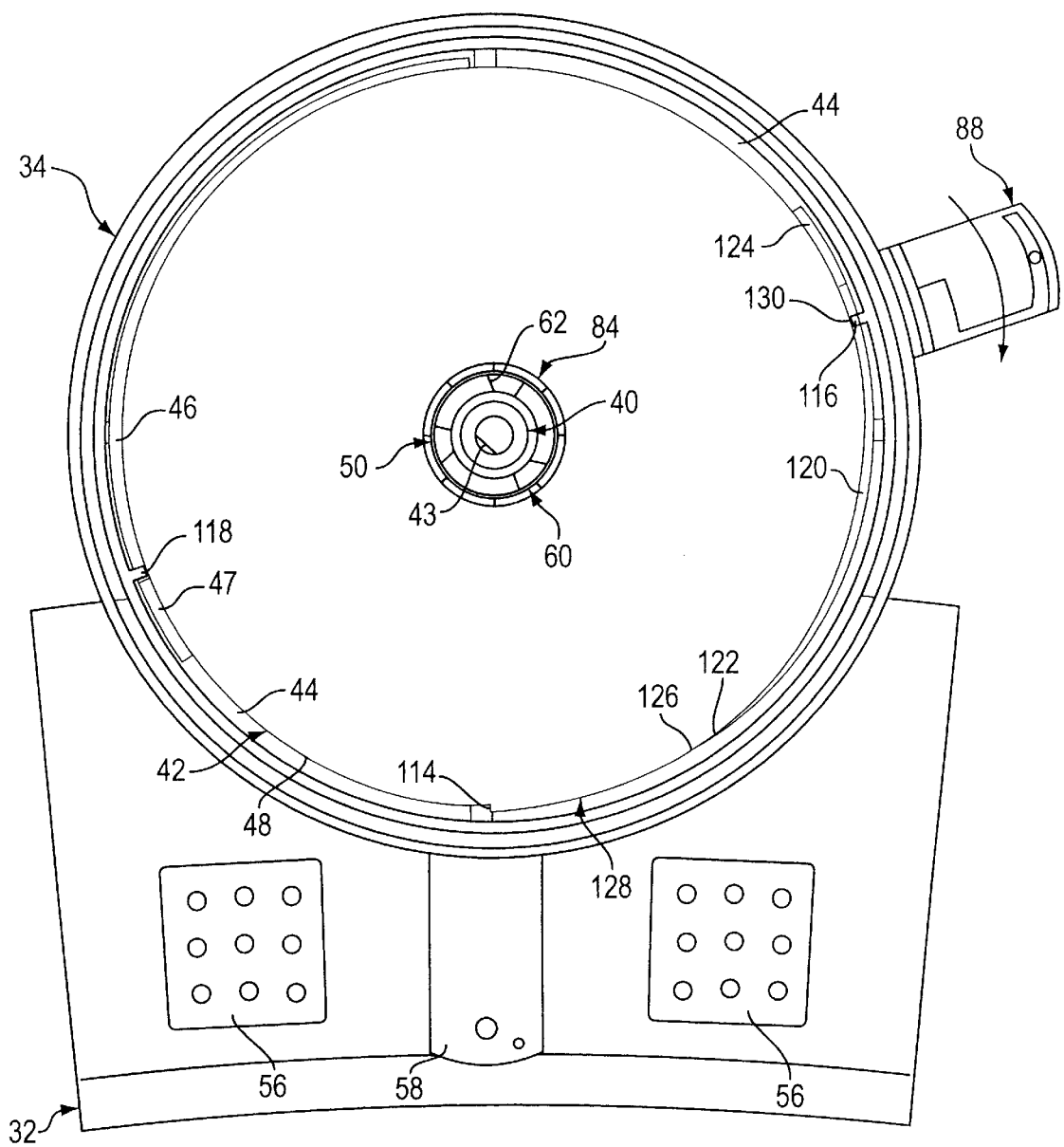
FIG. 13 is a top view showing the bowl being moved in an incorrect direction in an attempt to assemble the bowl with the base housing.
Figure 14:
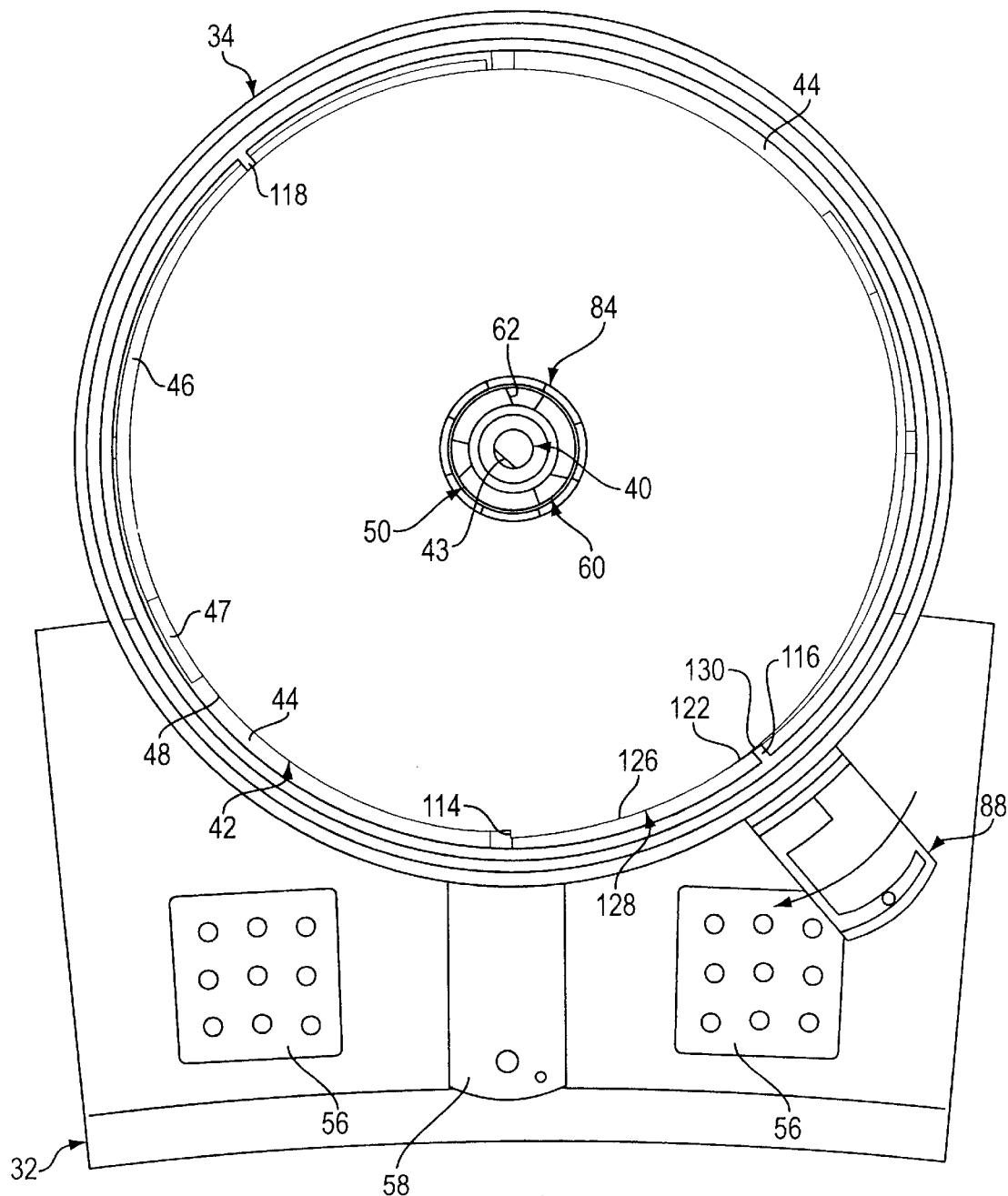
FIG. 14 is a top view showing the bowl being moved further in an incorrect direction in an attempt to assemble the bowl with the base housing, and further showing facility on the bowl and the base housing for preventing the bowl and base housing being assembled in accordance with certain principles of the invention.

Referring to FIG. 13, the user may attempt to assemble the bowl 34 with the base housing 32 by initially and mistakenly positioning the bowl in an incorrect starting position, seating the ribs 116 and 118 on the incorrect ledges 124 and 46, respectively, and by moving the bowl in an incorrect, or clockwise, direction. For example, the handle 88 may be positioned mistakenly at a two-o'clock position as shown in FIG. 13 and rotated in a clockwise direction. As the handle 88 is moved in a clockwise direction, as shown in FIG. 14, a radially inboard face 130 of the rib 116 will be wedged against the wedging arc section 128 of the side wall 48 to preclude the handle from being moved into the assembled position at the six o'clock position. This structure, then, precludes the accidental or mistaken attempt to move the handle 88 into assembly with the handle base 58 from the incorrect direction, thereby avoiding any damage to the mating structures thereof. Once the user can not move the handle 88 any further than the wedging arc section 128, and thereby realizes that bowl 34 was initially assembled with the base housing 32 in the incorrect manner, the user can now move the handle 88 in a counterclockwise direction to free the rib 116 from engagement with wedging arc section of the side wall 48. The bowl 34 can now be repositioned and the assembly procedure properly initiated in the manner described above.

Referring to FIGS. 7, 8, 9 and 10, a food processing implement 132 is formed with a circular ring-like base 134 and a post 136, shaped like an inverted cone, with a larger end thereof extending upward from the base. A metal button 138 is located at the top of the post 136 on a smaller end of the post opposite the larger end thereof. A pair of blades 140, which could be metal or plastic, extend laterally outward from the circular base 134. The implement 132 is formed with a shell-like opening 141 which extends axially inward of the implement from the bottom of the base 134. The implement 132 if also formed with a sleeve 143, which is located axially within the opening 141 and is shaped internally in complementary fashion to receive the upper end of the shaft 40 and the flat surface 43. In this manner, the implement 132 is rotated when the motor 38 is operated to accomplish the processing of the food within the bowl 34.

The surface of a major portion of the exterior of the post 136 is formed with a uniform surface structure which follows the inverted cone configuration. To assist the user in handling the implement 132, a pair of depressions 142 are formed on opposite sides of the post 136 immediately below the upper end thereof and the metal cap 138. The depressions 142 are outside of the major, uniform surface structure of the post 136, and deviate from the uniform surface structure to provide facility for the user to place two fingers, such as, for example, the thumb and the index finger, into the depressions to obtain a firm grip of the implement 132.

In addition, a transaxial opening 144 is formed through the post 136 in line with the depressions 142 in such a manner that the depressions surround the opposite ends of the opening, and is also a deviation from the uniform surface structure of the post 136. When the thumb and the index finger, for example, are placed in the depressions 142, portions of the tips of the thumb and index finger may enter slightly into the opposite ends of the opening 144 to further enhance the gripping of the implement 132 by the user. Also, the size of the opening 144 is sufficient to allow the user to insert one finger into the opening and handle the implement 132 in that manner. The user may insert two fingers into opposite ends of the opening 144 and grip the implement in that manner. Further, the user may insert one finger, such as the index finger, into the opening 144, and place the thumb firmly on the metal button, to obtain a firm grip for handling the implement 132.

In any event, either the depression 142 or the opening 144, or both together, can be used to facilitate the firm gripping of the implement 132 for any purpose such as, for example, cleaning, assembling and storing.

Also, the narrowing configuration of the inverted cone-shaped post 136 near the top thereof, in conjunction with the location of the depressions 142 and the opening 144, allows the user to bring the user's gripping fingers close together with a near-pinching effect. This further enhances the firmness of the user's grip of the implement 132. If the post 136 was cylindrical, for example, the user's gripping fingers would be spread further apart resulting in a lesser pinching effect, and thereby a less firm grip of the implement 132.

As shown in FIGS. 5 and 6, the top of the bowl 34 is formed with a wall 146 below the top edge 74 which is recessed from the bowl side wall 70. A ledge 148 extends from the bottom of the recessed wall 146 and the top of the side wall 70 of the bowl 34. A plurality of rectangularly shaped bosses 150 are formed spatially around, and extend radially outward from, the recessed wall 146.

Figure 17:
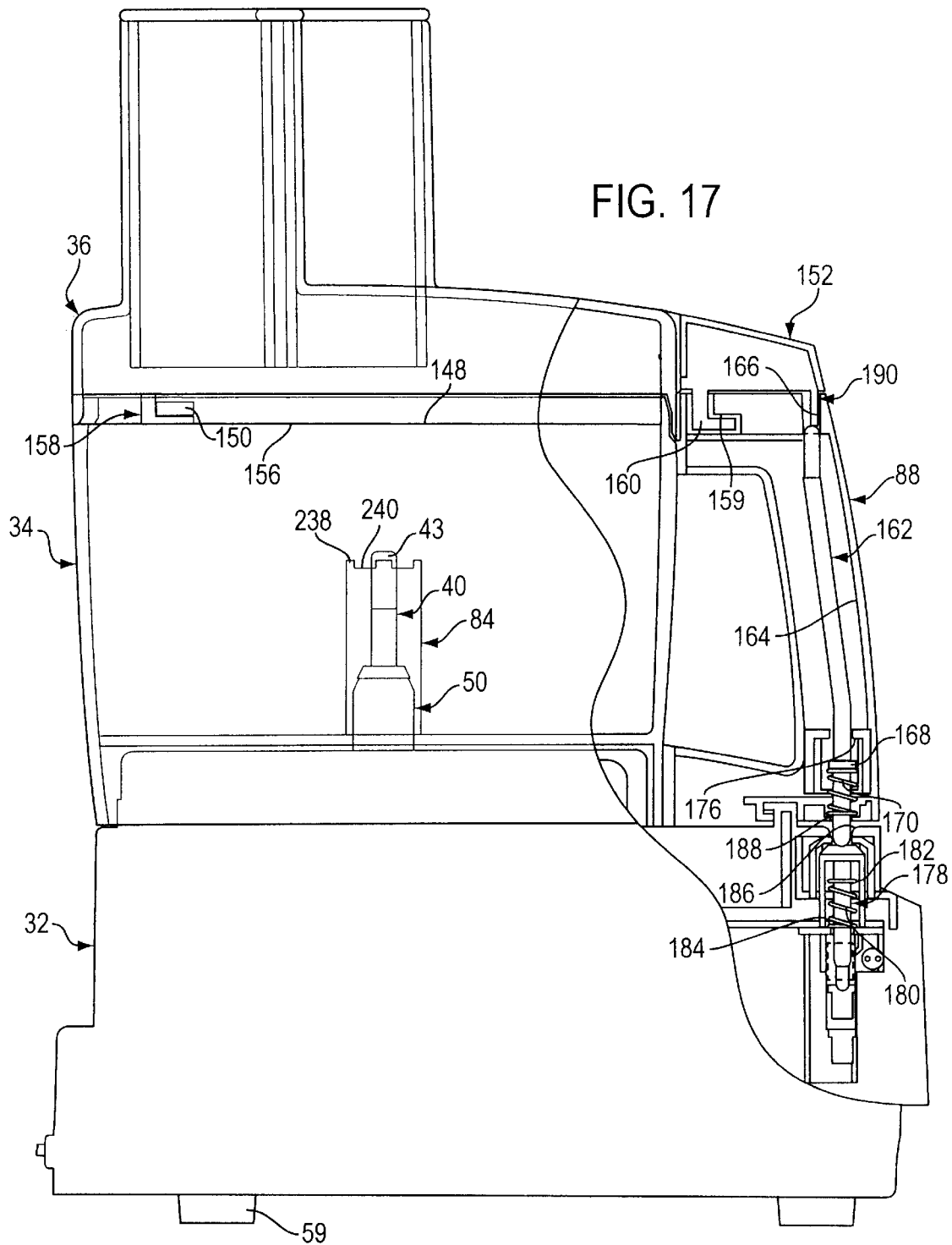
FIG. 17 is a side view of the base housing, the bowl and the lid in full assembly and with the switch-actuating linkages having been moved to operate a secondary switch responsive to the base housing, the bowl and the lid being in the proper assembled position.
Figure 22:
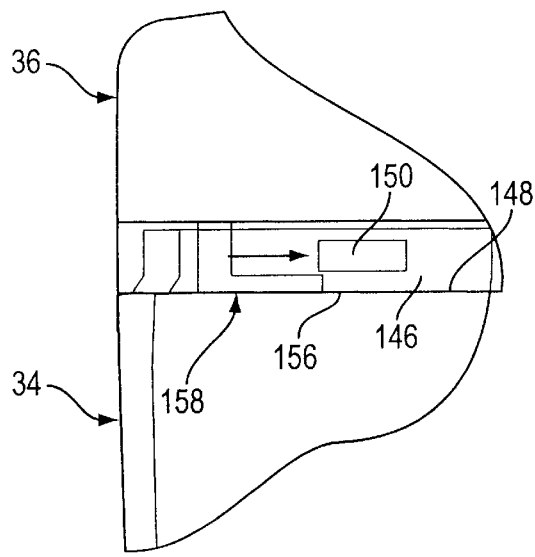
FIG. 22 is partial side view showing structure formed on the bowl and the lid in near position for latching the lid with the bowl.
Figure 23:
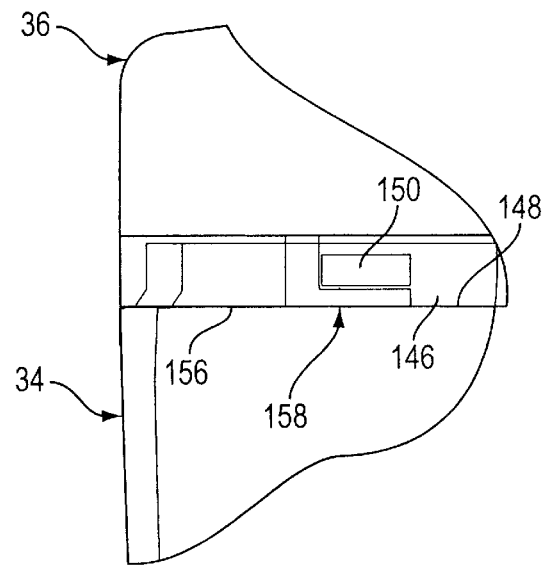
FIG. 23 is a partial side view showing the structure of the bowl and the lid of FIG. 22 in the assembled latched position.

As shown in FIGS. 1 and 17, the lid 36 is formed with a handle top 152 which extends radially outward from a portion of a lid side wall 154. As shown in FIGS. 17, 22 and 23, the lid is formed with a bottom edge 156 which seats on the ledge 148 (FIG. 6) of the bowl 34. A plurality of "L" shaped interlocks 158 are formed on an inner wall of the lid 36 just above the bottom edge thereof, and correspond in number to the number of the bosses 150 of the bowl 34. As shown in FIG. 22, the lid 36 is placed on the bowl 34 and moved in the direction of the arrow, whereby each of the "L" shaped interlocks 158 are aligned to move into interlocking engagement with a respective one of the bosses 150 of the bowl 34 in the manner shown in FIG. 23. In this manner, the lid is attached to the bowl 34.

Figure 16:
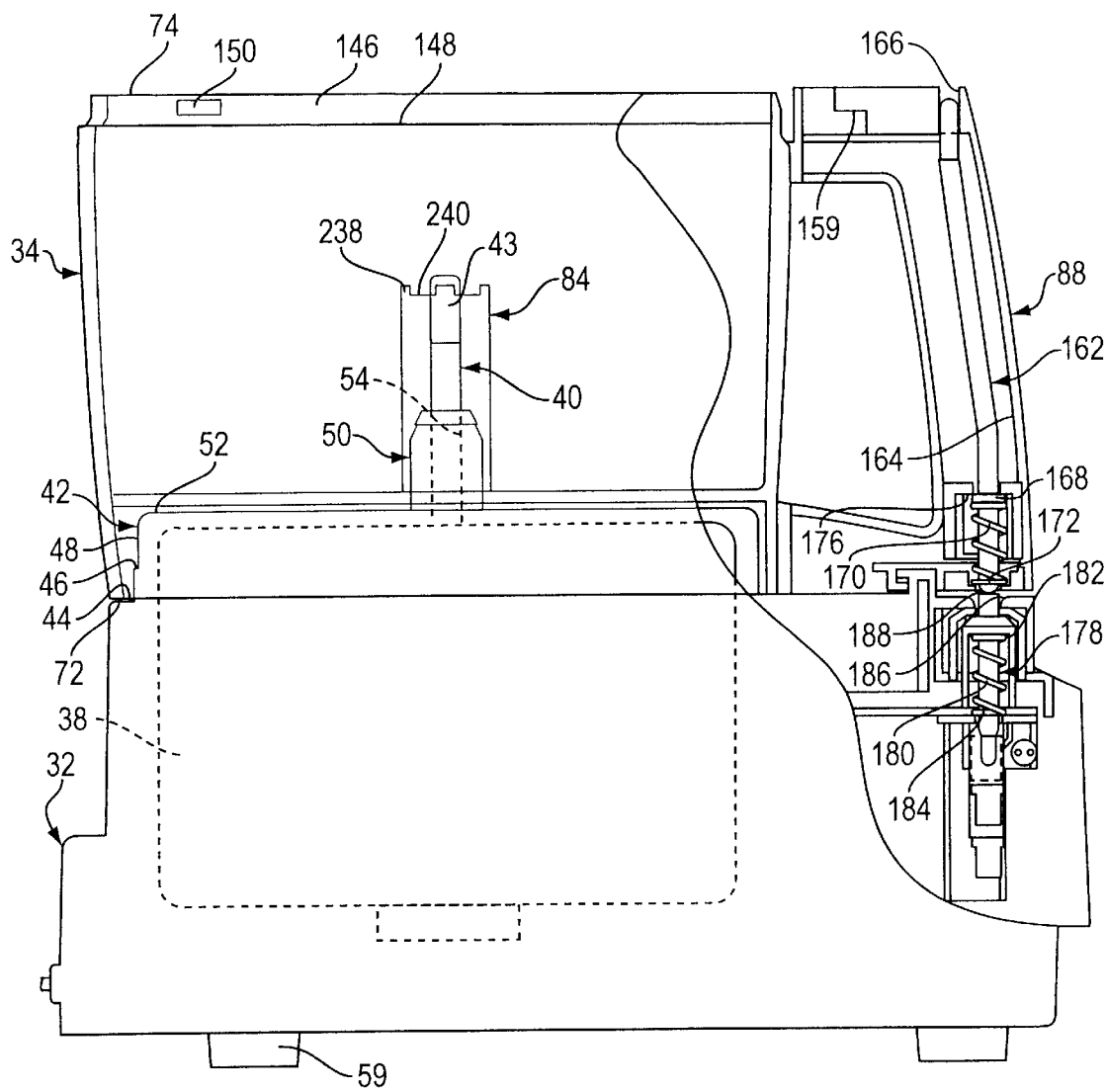
FIG. 16 is a side view of the assembled base housing and the bowl with portions broken away showing switch-actuating linkages in assembly within the base housing and the handle of the bowl.
Figure 20:
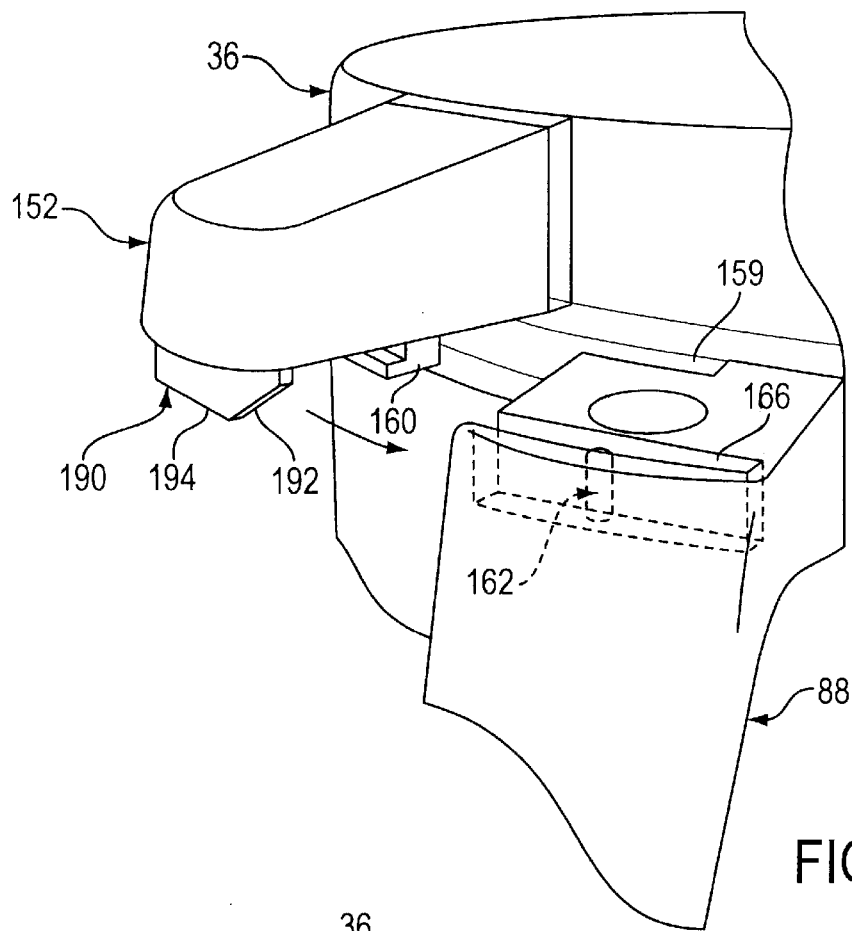
FIG. 20 is a partial perspective view of a top of the handle of the bowl and the handle portion of the lid with the lid nearing the assembled position.

As shown in FIGS. 16 and 17, the handle 88 is formed with an "L" shaped slot 159 at the top thereof which is positioned to receive an "L" shaped interlock 160, formed on the underside of the handle top 152, which is shown in FIGS. 17 and 20. As further shown in FIG. 16, a first actuator rod 162 is located within a hollow inner portion 164 of the handle 88 and the upper end of the rod is located in a slot 166 formed in the top of the handle, but does not protrude therefrom. A flange 168 is formed about a lower portion of the rod 162. The lower end of a spring 170 rests on a fixed surface 172 while the upper end of the spring engages a radial flange 174 which is formed on the rod 162. An upper fixed surface 176 precludes the flange 174 from moving upward any further than as illustrated in FIG. 16.

A second actuator rod 178 is located within the base housing 32 for alignment with the lower end of the first actuator rod 162 and has a spring 180 around an upper portion of the second rod. The spring 180 is captured between a radial flange 182 formed toward the upper end of the second rod 178 and a fixed surface 184 located toward the lower end of the second rod. The second rod 178 is movable, then, within the base housing 32 but never protrudes outward from within an opening 186 (FIG. 11) formed in the handle base 56. The rods 162 and 178 are shown in the deactivated state in FIG. 16.

Prior to assembly of the bowl 34 with the base housing 32, the second rod 178 is biased to a position where the top thereof is flush with, or just inside of, the surface of the housing which surrounds the mouth of the opening 186. Also, the first rod 162 is biased by the spring 170 to a position where the top of the rod is well into the slot 166, but does not extend upward from the slot. The bottom of the rod 162 is located flush with, or just inside of, the mouth of an opening 188 formed in the underside of the handle 88. With the rods 162 and 178 being in the deactivated state as described, the handle 88 can be moved into unobstructed assembly with the handle base 58 when the bowl 34 is assembled with the base housing 32.

Figure 21:
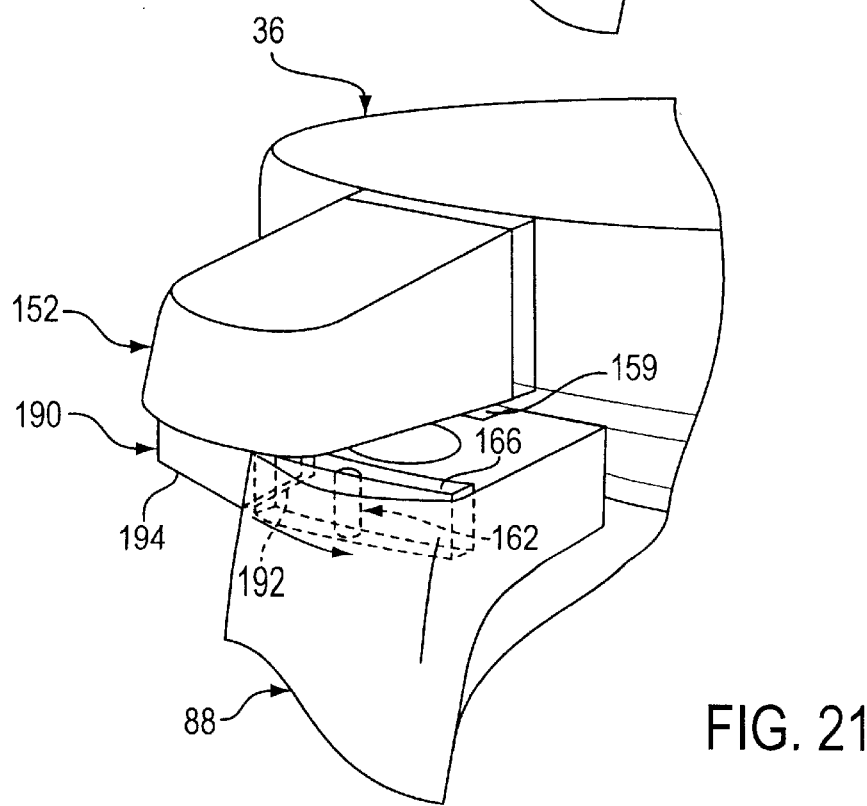
FIG. 21 is a partial perspective view of the top of the handle of the bowl and the handle portion of the lid showing the handle portion entering the assembly position to actuate the secondary switch.

With the bowl 34 in assembly with the base housing 32, the lid 36 is assembled with the bowl 34 as described above. Referring to FIGS. 17, 20 and 21, as the handle top 152 approaches its home position in assembly with the handle 88, a cam blade 190, which is suspended beneath the handle top, enters the slot 166. Eventually, a camming surface 192 of the blade 190 engages the top of the first rod 162 and gradually moves the rod downward to the position shown in FIG. 17, while an undersurface 194 of the blade maintains the first rod in the downward position. As the first rod 162 is moved to the position shown in FIG. 17, the second rod 178 is moved downward by the first rod.

Figure 18:
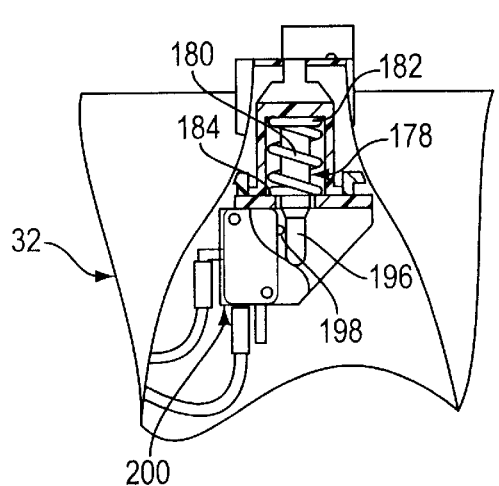
FIG. 18 is a side view of the secondary switch in a nonoperated position.
Figure 19:
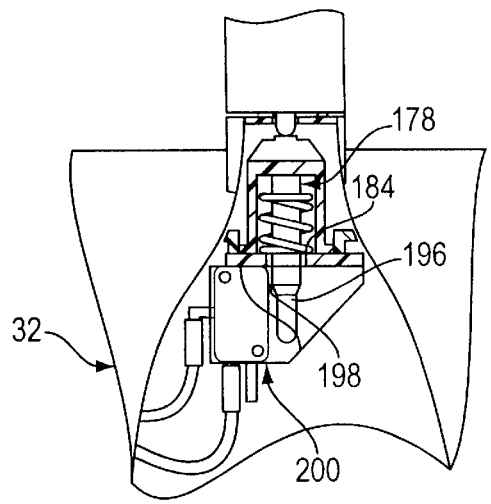
FIG. 19 is a side view of the secondary switch in an operated position.

Referring to FIG. 18, a lower section 196 of the second rod 178 is formed with a reduced diameter, and is located adjacent an actuator button 198 of an electrical switch 200. When the rod 178 is in the deactivated state, the reduced diameter of the lower section 196 allows the button to be spring biased outward whereby the switch 200 is in the deactuated state. As shown in FIG. 19, when the second rod 178 is moved downward upon assembly of the bowl 34 with the base housing 32, a larger-diameter intermediate section of the rod pushes the button 198 inward of the switch 200 to thereby actuate the switch. A user-operated switch (not shown) is connected in circuit with the switch 200 and is controlled by manipulation of the compliant pads 56 to apply, or remove, operating energy to the motor 38 for operation of the food processor 30.

The switch 200 serves as a condition monitor to insure that the base housing 32, the bowl 34 and the lid 36 are properly assembled before the motor 38 can be operated by user operation of the motor control switch.

As shown in FIG. 1, the lid 36 is formed with a two-chute unit 201 including two feed chutes 202 and 204, which are of different configurations but which share a common wall 206. The feed chutes 202 and 204 provide passages for feeding foodstuff into the bowl 34 during a food processing operation. To assist in the feeding of the foodstuff, a food pusher 208 is formed with two pusher sections 210 and 212, which are spaced slightly from each other by a clearance space 214. Each of the sections 210 and 212 are formed with top flanges 216 and 218, respectively, and are joined together by a common top flange section 220, which allows the two sections 210 and 212 to be manipulated together. The clearance space 214 provides sufficient clearance for the pusher sections 210 and 212 to be moved on either side of the common wall 206 of the chutes 202 and 204. The bottoms of the pusher sections 210 and 212 are formed with patterned surfaces (not shown) which aid in the foodstuff pushing process. Further, the chutes 202 and 204 are located on top of the lid 36 and toward the side thereof which is opposite the handle 88 and handle top 152 for convenience of the user.

Figure 24:
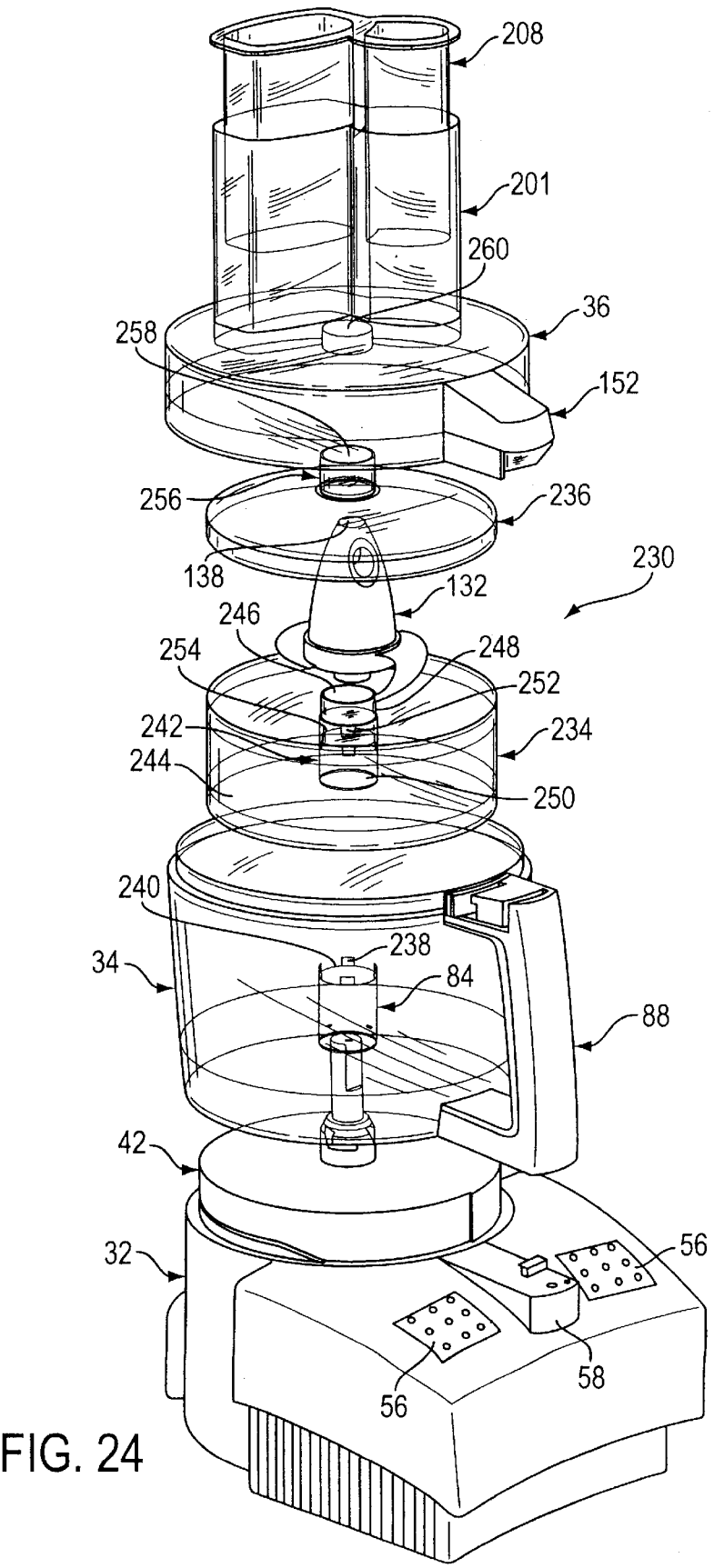
FIG. 24 is an exploded perspective view of the food processor of FIG. 1 with the addition of a smaller bowl and lid.

Referring to FIG. 24, a food processor 230 includes the same components as the food processor 30 (FIG. 1), and further includes a small bowl 234 and lid 236. The sleeve 84 is formed with a plurality of spaced tabs 238 which upward from the top of the hub, and with spaces 240 between the tabs. The small bowl 234 is formed with a central chimney 242, located about the axis of the small bowl, which extends upward from a floor wall 244 thereof and which is formed with an opening 246 through the chimney. The opening 246 is formed by an upper section 248 of a prescribed diameter and a lower section 250 at a diameter slightly larger than the prescribed diameter.

At the juncture of the upper section 248 and the lower section 250 of the opening 246, a plurality of protrusions 252 are formed with spaces 254 between the protrusions. Axially facing walls of the protrusions 252 are formed at the prescribed diameter of the upper section 248 and axially facing walls of the spaces 254 are formed at the slightly larger diameter of the lower section 250. The lid 236 is formed with a central chimney 256, located about the axis of the lid, which extends upward from the top of the lid and which is formed with an opening 258 therethrough. A pressure disc 260 is attached centrally axially to the underside of the lid 36.

When using the food processor 230 with the small bowl 234, the small bowl is inserted into the larger bowl 34 whereby the protrusions 252 within the chimney 242 locate within the spaces 240 at the top of the sleeve 84. At the same time, the tabs 238 formed at the top of the sleeve 84 are located in the spaces 254 of the chimney 242 of the lid 236. In this manner, the small bowl 234 is located transaxially within the bowl 34. The shell-like opening 141 accommodates the positioning of the implement 132 over, and around, the chimney 242 of the small bowl. At the same time, the opening of the sleeve 143 of the implement 132 is inserted into the opening 246 of the chimney 242, and the opening of the sleeve 143 is inserted over the drive shaft 40 in the same manner as described above. The implement 132 is now coupled through the shaft 40 to the motor 38 and will be rotated upon operation of the motor.

Thereafter, the lid 236 is placed onto the upper edge of the small bowl 234 whereby the chimney 256 is position about the upper portion of the implement 132 with the button 138 of the implement being located within the opening 256 of the chimney but accessible for contact through the opening from the top of the chimney 256. The large lid 36 is then assembled with the large bowl 34 in the manner described above. As the large lid 36 is being assembled, the pressure disc 260 is moved into the top of the opening 258 of the chimney 256, and engages, and applies pressure to, the button 138 at the top of the implement 132 to preclude axial movement of the small bowl 234 during operation of the food processor 230.

The food processors 30 and 230 include the slot 60 of the hub 50 to insure that the bowl 34 is gradually assembled with the base housing 32, rather than by an abrupt assembly of the bowl with the housing. This provides a user-friendly system during the assembly process. Further, in the processors 30 and 230, the location of the rib 116 on the bowl 34, in conjunction with the wedging arc section 128 on the side wall 48 of the base housing 32, precludes the accidental assembly of the bowl from the incorrect direction. Also, the food processors 30 and 230 include the implement 132 with the formation of the depressions 142 and the opening 144 near the top of the implement to provide facility for easy and ready grasping of the implement for purposes of handling thereof. In addition, the narrowing of the inverted cone-shaped post 136 near the top thereof further enhances the firmness of the gripping of the implement 132 by the user.

In general, the above-identified embodiments are not to be construed as limiting the breadth of the present invention. Modifications, and other alternative constructions, will be apparent which are within the spirit and scope of the invention as defined in the appended claims.

What is claimed is:

1. A food processor, which comprises:

a base housing, a bowl;

the base housing formed with a first housing structure and the bowl formed with a first bowl structure which facilitate placement of the bowl onto the base housing for movement of the bowl circumferentially relative to the base housing in a first and proper direction toward a final food processing position thereof, and in a second and improper circumferential direction toward the food processing position;

the base housing formed with a second housing structure which cooperates with a second bowl structure formed on the bowl for precluding movement of the bowl relative to the base housing into the food processing position thereof when the bowl is being moved in the second and improper circumferential direction.

2. The food processor as set forth in claim 1, wherein the first housing structure comprises:

a side wall formed on the base housing; and a ledge formed outward from the side wall of the base housing; and wherein the first bowl structure comprises:

a rib formed on the bowl in a location for positioning thereof onto the ledge when the bowl is positioned on the base housing.

3. The food processor as set forth in claim 2 wherein the ledge is a first ledge, which further comprises:

a second ledge formed outward from the side wall of the base housing at a level lower than a level of the first ledge;

the level of the second ledge being a level at which the bowl is assembled with the base housing when the bowl is moved in the first and proper direction for operation of the food processor; and a ramp which extends from an end of the first ledge to a portion of the second ledge, over which the rib travels during assembly of the bowl with the base housing.

4. The food processor as set forth in claim 1, wherein the second housing structure of the base housing comprises:

a side wall formed on the base housing and having a first section thereof formed in a generally circular configuration; and the side wall formed with a second section which extends gradually radially outward from the generally circular section; and the second bowl structure comprises:

the bowl formed in a generally circular configuration complementary to the circular configuration of the first section of the side wall of the base housing; and the bowl formed with wedging structure which engages the second section of the side wall of the base housing when the bowl is moved in the second or improper direction to preclude further movement of the bowl relative to the base housing.

5. The food processor as set forth in claim 4, wherein the wedging structure of the bowl includes a rib formed on the bowl in a radially inward direction.

6. The food processor as set forth in claim 1, which further comprises:

a hub mounted on the base housing;

the bowl having an opening formed through a bottom floor thereof and at least one projection extending laterally therefrom into the opening;

the opening of the bowl being locatable about the hub and the bowl being mountable on the base housing;

the hub formed with structure for receiving the projection of the bowl as the bowl is being assembled with the base housing and configured to facilitate gradual movement of the bowl into assembly with the base housing and about the hub.

7. The food processor as set forth in claim 1, which further comprises:

a shaft extending upward from the base housing and into the bowl; and a shaft-mountable food processing implement formed with a uniform surface structure over a first section thereof and a second structure having a structure which is radially offset from the plane of the uniform surface structure formed in a second section thereof to allow a user to obtain a firm grip of the implement during handling thereof.

8. The food processor as set forth in claim 7, which further comprises:

a hub mounted on the base housing;

the bowl having an opening formed through a bottom floor thereof and at least one projection extending laterally therefrom into the opening;

the opening of the bowl being locatable about the hub and the bowl being mountable on the base housing;

the hub formed with structure for receiving the projection of the bowl as the bowl is being assembled with the base housing and configured to facilitate gradual movement of the bowl into assembly with the base housing and about the hub.

9. A food processor, which comprises:

a base housing;

a hub mounted on the base housing;

a bowl having an opening formed in a bottom thereof and at least one projection extending laterally therefrom into the opening;

the opening of the bowl being locatable about the hub and the bowl being mountable on the base housing;

the hub formed with structure for receiving the projection of the bowl as the bowl is being assembled with the base housing and configured to facilitate gradual and rotational movement of the bowl into assembly with the base housing and about the hub;

a shaft extending upward from the base housing and into the bowl; and a shaft-mountable food processing implement formed with a uniform surface structure over a first section thereof and a second structure which is radially offset from the plane of the uniform surface structure formed in a second section thereof to allow a user to obtain a firm grip of the implement during handling thereof.

10. The food processor as set forth in claim 9, wherein the structure of the hub comprises a slot formed in the hub and into which the projection is positioned to facilitate the gradual and rotational movement of the bowl.

11. The food processor as set forth in claim 10, wherein the slot comprises:

a leg of the slot formed in an exterior side wall of the hub at an angle with respect to the axis of the hub and having an upper end and a lower end; and the leg of the slot being formed with a bearing wall upon which the projection engages, at the upper end, and travels over, to the lower end, at the formed angle of the leg to impart downward and rotary motion to the bowl.

12. The food processor as set forth in claim 11, wherein the leg is a first leg of the slot, and the slot further comprises:

a second leg of the slot formed transaxially in the exterior wall of the hub;

a first end of the second leg being located at a communicating juncture with the lower end of the first leg; and a second end of the second leg of the slot being spaced from the first end thereof and formed with a stop wall which precludes further movement of the bowl relative to the base housing and the hub.

13. A food processor, which comprises:

a base housing;

a bowl mountable on the base housing and formed with an opening in a bottom floor thereof;

a shaft extending upward from the base housing, through the opening and into the bowl; and a food processing implement, mountable onto the shaft within the bowl, formed with a uniform surface structure over a first section thereof and a second structure which is radially offset from the plane of the uniform surface structure formed in a second section thereof to allow a user to obtain a firm grip of the implement during handling thereof.

14. The food processor as set forth in claim 13, wherein the second structure is a depression formed in the uniform surface structure to be radially offset therefrom and thereby provide a facility for the user to obtain the firm grip of the implement.

15. The food processor as set forth in claim 13, wherein the second structure is an opening formed in the implement which provides facility for the user to obtain the firm grip of the implement.

16. The food processor as set forth in claim 15, wherein the second structure is a depression formed in the uniform surface structure, surrounding the opening to be radially offset therefrom and thereby provide a facility for the user to obtain the firm grip of the implement.

17. The food processor as set forth in claim 13, wherein the food processing implement comprises:

a post having smooth exterior surface and formed in the shape of an inverted cone;

the inverted cone shape of the post being large at a bottom thereof, and narrow at a top thereof;

a portion of the post immediately adjacent the narrow top thereof formed with a surface structure for gripping the implement.

\* \* \* \* \*